P. L. CLARK.
PROJECTION SCREEN.
APPLICATION FILED JUNE 26, 1913.
1,279,262.
Patented Sept. 17, 1918.
4 SHEETS—SHEET 4.
FIG. 35
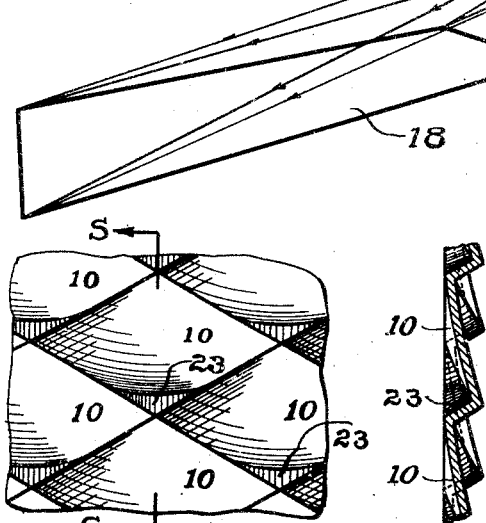
FIG. 42  FIG. 43
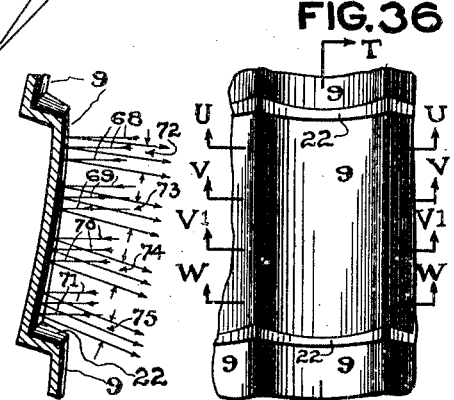
FIG. 37  FIG. 36
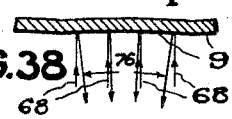
FIG. 38
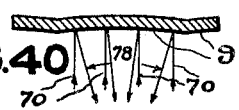
FIG. 39
FIG. 40
FIG. 41
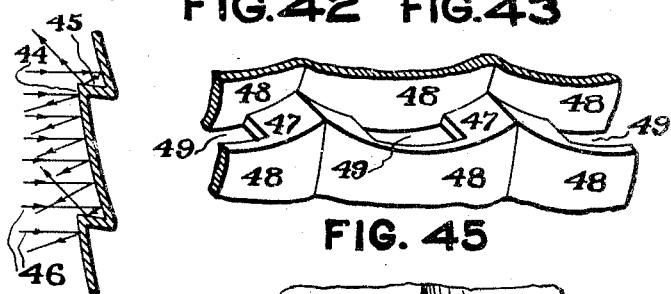
FIG. 45
FIG. 44
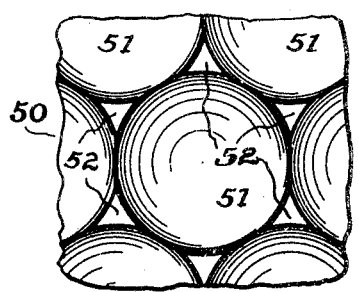
FIG. 46
WITNESSES:
James A. Carr
Archibald Black
INVENTOR
Paul L. Clark.

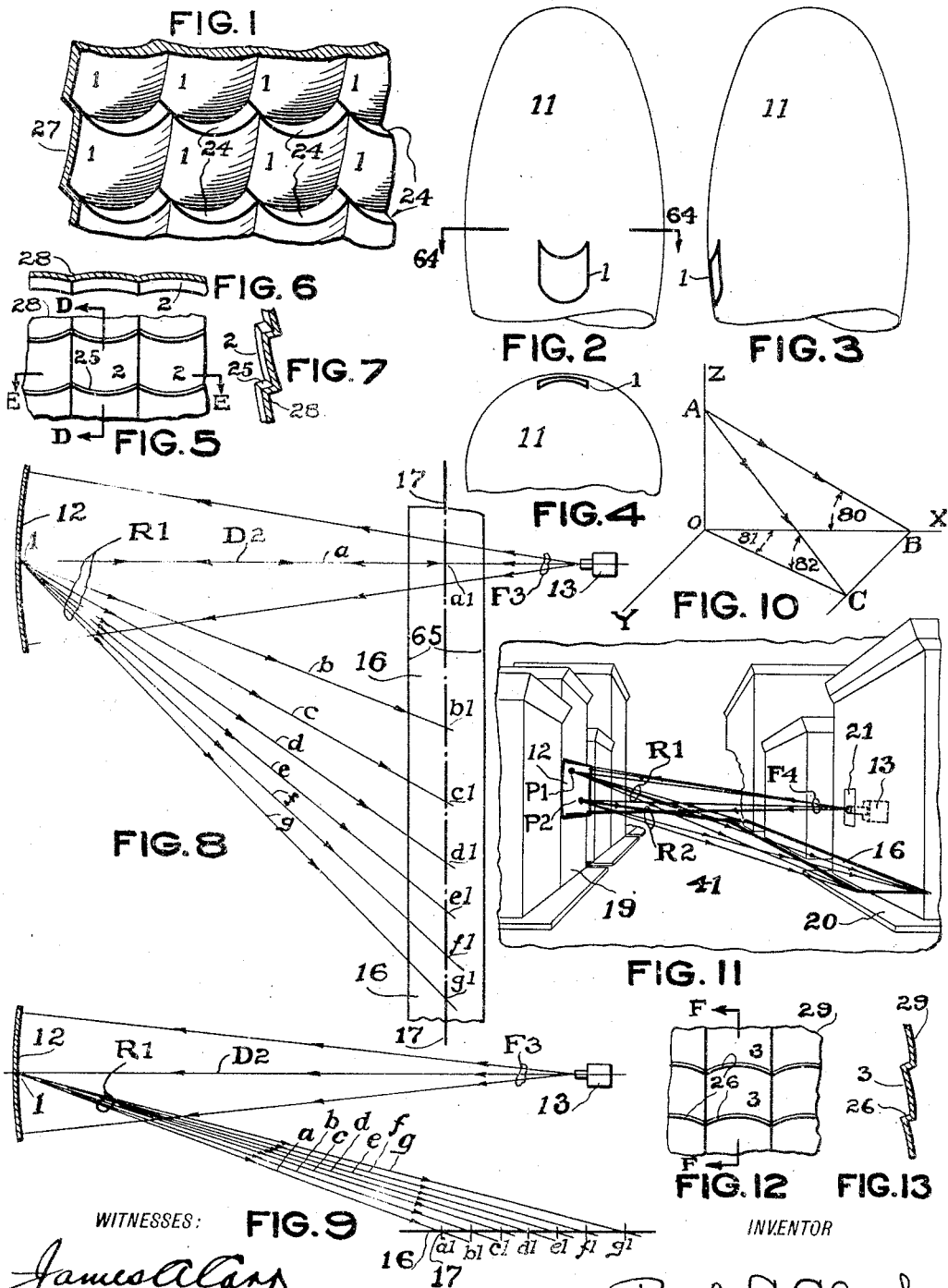

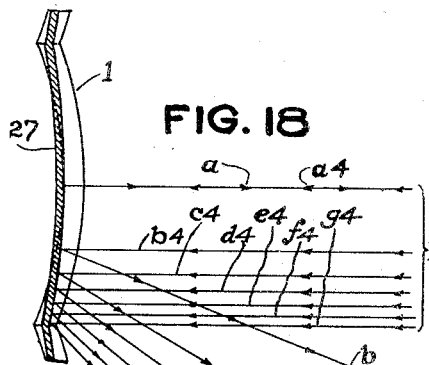
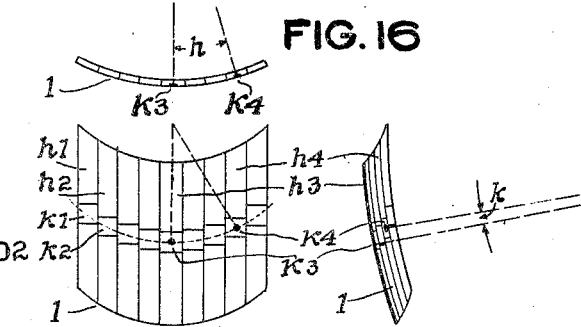
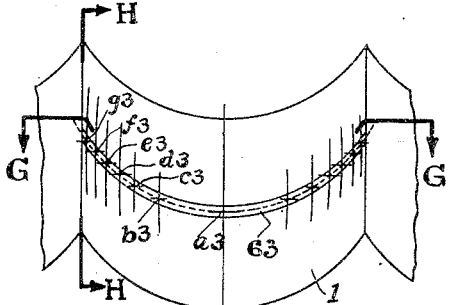
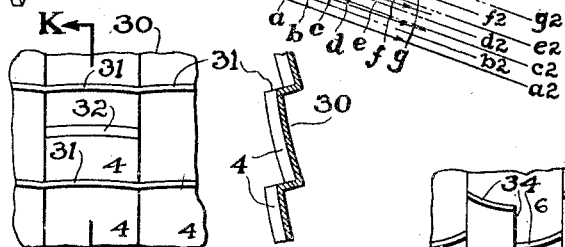
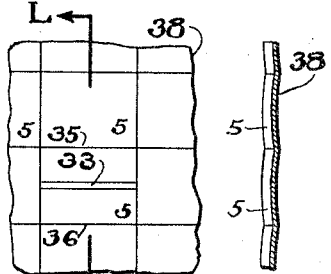
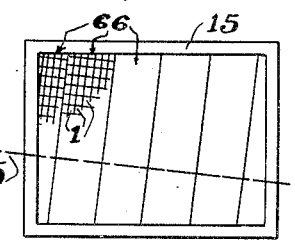
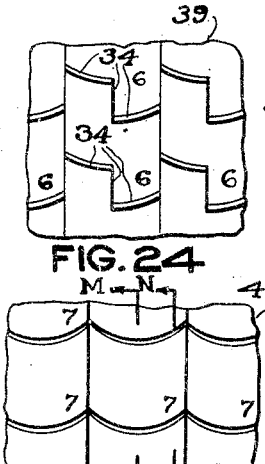

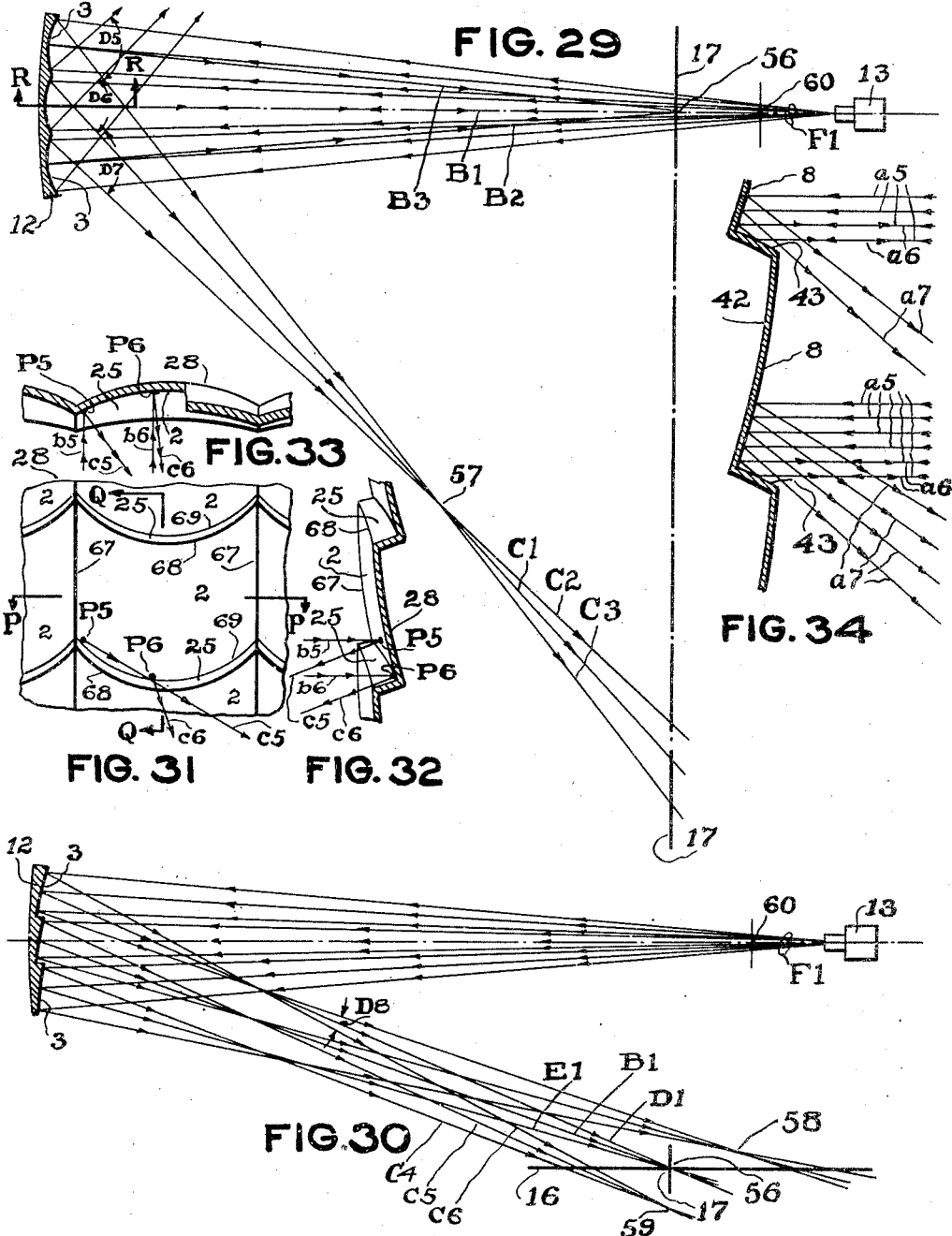

UNITED STATES PATENT OFFICE.

PAUL L. CLARK, OF BROOKLYN, NEW YORK.

PROJECTION-SCREEN.

1,279,262.  Specification of Letters Patent.  Patented Sept. 17, 1918.

Application filed June 26, 1913.  Serial No. 775,992.

*To all whom it may concern:*

Be it known that I, PAUL L. CLARK, a citizen of the United States, residing at Brooklyn, in the county of Kings and State of New York, have invented new and useful Improvements in Projection-Screens, of which the following is a specification.

This invention relates to projection screens for magic lanterns, moving picture machines or other projection apparatus, and especially to that type of screen employing a specular surface provided with a great plurality of accurately curved protuberances closely adjacent to each other.

One object of the invention is to effect a very precise distribution of the rays reflected from the screen, so that the image on the screen can be viewed by spectators positioned within a predetermined area or areas; and in this connection it may be stated that generally the rays from the screen should be so reflected as to embrace a solid viewing angle which intersects a surface (generally plane), one or more sides of whose periphery is of predetermined position and configuration.

Other objects and special features of the invention are shown in the accompanying specification and drawings and further pointed out in the claims.

In the drawings:

Figure 1 is a perspective view of a portion of the screen structure and shows a plurality of curved specular elements made either of glass, silvered on the back, or polished metal, arranged obliquely and in horizontal rows; Figs. 2, 3 and 4 are respectively a front, side and bottom view of an ellipsoid, showing the portion of the ellipsoidal surface employed for the elements shown in Fig. 1; Fig. 5 is a front elevation and Figs. 6 and 7 are sections of Fig. 5 taken respectively at E—E and D—D, and show a modified form of element; Figs. 8 and 9 show respectively a horizontal and vertical cross-section through a curved screen, and illustrate also the proper angles of inclination of the rays reflected from any given point or element on the screen when the rays are required to intersect a given horizontal straight line; Fig. 10 is a geometrical diagram and is used to demonstrate a method for determining the relationship between vertical and horizontal angles of divergence of a light ray so reflected from a given point on the screen as to intersect a given point in the viewing surface; Fig. 11 is a perspective view of a plant showing a projector on one side of a street, a curved screen on the other side, and a horizontal surface intersected by the rays downwardly reflected by the said screen; Fig. 12 is a front elevation and Fig. 13 is a section at F—F, Fig. 12, of a modified form of elements; Fig. 14 is a front view of a unit curved specular surface, and Figs. 15 and 16 are respectively a side and top view of Fig. 14, and show certain details of construction of a standard element; Fig. 17 is a front view of a unit curved specular surface, and Figs. 18 and 19 are cross-sectional views of Fig. 17, taken respectively at G—G and H—H, and show the graphical construction employed in determining the shape of the specular surface for a screen designed for use in a general case; Fig. 20 is a front elevation and Fig. 21 is a section at K—K, Fig. 20, and show modified types of elements; Fig. 22 is a front elevation and Fig. 23 is a section of Fig. 22 at L—L, and show a modified type of element; Fig. 24 is a front view of a modified type of element for use in certain cases; Fig. 25 is a front view of a modified type of screen for use on an inclined surface; Fig. 26 is a front elevation, and Figs. 27 and 28 are sections of Fig. 26 taken respectively at M—M and N—N, and show a form of element made of transparent material; Fig. 29 is a horizontal cross-section through a curved screen, and shows the approximate paths of incident and reflected rays projected upon curved specular elements on the screen surface, and Fig. 30 is a cross-sectional view at R—R, Fig. 29, and shows also the intersection of the rays with a given surface; Fig. 31 is a front view, and Figs. 32 and 33 are cross-sectional views of Fig. 31, taken respectively at Q—Q and P—P, and show the reflection of light rays from an element similar to that shown in Figs. 5, 6 and 7; Fig. 34 is a cross-sectional view showing a modified form of reflecting surface adapted to reflect light in two directions; Fig. 35 is a perspective view of a plant showing a projector, a curved screen and a plane surface intersected by the pencils of light reflected and diffused by the elements on the screen; Fig. 36 is a front view of a modified form of specular element, and Figs. 37, 38, 39, 40 and 41 are sections of Fig. 36 taken respectively at T—T, U—U, V—V, $V^1$—$V^1$ and W—W; Fig. 42 is a front view of a modified form of element, and Fig. 43 is a section at S—S, Fig. 42; Fig. 44 is a cross-sectional view of a portion of a screen plate provided with a receding or depressed joining structure between adjacent rows of elements; Fig. 45 is a perspective view of a portion of a screen plate provided with openings in the joining structure between adjacent rows of elements; Fig. 46 is a front elevation of a portion of a modified form of screen plate provided with openings.

In the drawings the same parts appearing in the different views are similarly designated.

Referring first to Fig. 1, it will be noted that I have shown a plurality of small elements 1 in horizontal rows arranged with identical angular relationship to the general screen surface 27; that each row is tipped forwardly so that the top of the elements in one horizontal row is in advance of the bottom of the next adjacent horizontal row; that the elements in vertical rows are connected by a curved structure 24 which may be called the "joining portion;" that this said joining portion 24 is convex in relation to the bottom, and concave in relation to the top of the element; that the top portion of the reflecting surface of the element is more nearly parallel to the general surface of the screen structure than is the bottom portion on account of the reflecting surface curving inwardly from top to bottom, and consequently the bottom portion forms a greater angle with the general screen surface than does the top. The surfaces, or elements, 1 are convex both vertically and horizontally, and may be of spherical, ellipsoidal or other curvature; they are preferably symmetrical with respect to a vertical plane through their center, and also should generally be of uniform size and shape.

In Figs. 2, 3 and 4, 11 represents a portion of an ellipsoid; it will be noted that the specular surface 1 (the same as shown in Fig. 1) lies on the surface of the said ellipsoid and below the horizontal plane 64—64 passing through the center of the ellipsoid. It will be noted that the vertical curvature of the surface 1 is less than the horizontal. The position of the element can be anywhere on the surface of the ellipsoid.

In Figs. 5, 6 and 7 the elements 2 are convex vertically and concave horizontally, and adjacent rows are retained at the proper degree of inclination by the transverse joining portion 25. The special advantages of this form of element will be mentioned in connection with the description of Figs. 31, 32 and 33.

In Figs. 8 and 9 a projector 13, located on or near the axis of the screen 12, projects rays of light $F^3$ to fall upon said screen. The mean pencil of rays $D^2$, indicated by a single line, strikes an element 1 (considered as a point on account of its relative size to the entire screen surface) in the center of the screen; a portion of these rays is diffused in the pencil $R^1$, which represents only half the horizontal angle of diffusion, and which comprises only that part of the rays reflected from a narrow transverse strip occupying the center of the element. It is desired that the reflected rays included in the pencil $R^1$ intersect a straight line 17—17 which lies in and preferably bisects a horizontal plane 16—only half of which is shown—which has parallel sides 65. The line 17—17 I designate the "mean viewing line" and the plane 16 the "mean viewing plane." The mean reflected ray $a$ intersects the line 17—17 perpendicularly at the point $a^1$; the ray $b$, reflected slightly sidewise, intersects the line 17—17 at $b^1$ and it will be noted, by reference to the development shown in Fig. 9, at a smaller angle of inclination to the horizontal than the ray $a^1$; similarly, as the sidewise or transverse angle of reflection becomes greater and greater, as shown for the rays $b$, $c$, $d$, $e$, $f$ and $g$, their inclination to the horizontal—provided they intersect the line 17—17—diminishes. This feature will be further explained in connection with Fig. 10. In reference to Fig. 9 it should be noted that $a$, which has been referred to as a reflected ray, may be considered as an end view of an oblique plane which, in reality, is the locus of all the oblique rays $a$, $b$, $c$, $d$, etc., emanating from the mean transverse differential strip of the element 1. Furthermore, this oblique plane $a$ is practically the locus of the rays reflected from the mean transverse differential strips of all the elements on the screen which are in the same horizontal row as the said element 1. It should be understood that the actual vertical angle of inclination of any ray reflected from the element 1 to pass through any given point in space may be readily determined, provided the horizontal angle of reflection of said ray is known. Consider that we know the position on the curved element of a spot which will reflect light to some given point in space, then the angles measured transversely and longitudinally to some other spot on the said element which will reflect its ray to pass through another point in space are half the longitudinal and transverse angles formed between the said rays reflected to the said points in space, since all rays incident upon said element are substantially parallel.

The above statement will be understood by bearing in mind the fact that the angles of incidence and reflection upon a plane mirror are equal; consider a plane mirror receiving a ray of light of, say, five degrees angularity with the normal to the mirror at the point of incidence of the said ray, then the angle between the incident and reflected ray will be ten degrees; now turn the mirror through an angle of, say, twelve degrees, so that the angle of incidence is now twelve plus the original five degrees. giving a total angle of incidence equal to seventeen degrees; the angle between the incident and reflected ray is now thirty-four degrees, which is twenty-four degrees greater than the original angle, or equal to twice the angle through which the mirror was turned. Now consider a polished spherical surface (or other surface of revolution) receiving a ray A upon a given point $A^1$ and reflecting it so as to pass through a given point $A^2$, in space, at a great distance from the said surface; then a second incident ray B, parallel to the first incident ray A, which will be reflected from the spherical surface to pass through a point $B^2$, in space, and which is located upon a line forming an angle of, say, 30 deg. with the reflected ray which passes through $A^2$, will be that particular ray which is reflected from a point lying in the aforesaid spherical surface and lying in the plane of the points $A^2$, $B^2$ and the center of curvature of the spherical surface; and the angle measured between the radii of the sphere which touch the points of incidence $A^1$ and $B^1$ will be 15 deg. (one-half of 30 deg.). The foregoing description may be considered as applying to two points lying in any plane transverse to the curved reflecting surface, or to two points in any plane longitudinal to the said surface. Consequently, any point, D, in space, say, 16 deg. below and 14 deg. to the right of a given point C will be intersected by a ray reflected from a point $D^1$ which is 8 deg. below and 7 deg. to the right of the point $C^1$, on a spherical, convex mirror, which reflects its ray to pass through the aforesaid given point C. A 15 deg. curved spherical mirror will disperse parallel rays of an incident beam through an angle of 30 deg.; and any two points on the mirror separated by an angle of, say, A deg., will reflect their rays $2^a$ deg. apart; and this is generally true regardless of whether the mirror be spherical, ellipsoidal or of other curvature.

In Fig. 10, ZOX, ZOY and XOY represent coördinate planes perpendicular to each other and intersecting each other at O. The line BC is parallel to OY and corresponds substantially with the line 17—17, Fig. 8, while the point A may be considered as corresponding with the point, or element 1, and the vertical plane ZOY with a tangent plane (not shown) to the general screen surface at the point 1. AB represents a reflected ray corresponding to the ray $a$, Figs. 8 and 9, and AC represents any other ray which is so reflected as to intersect the line BC at C. The angle of inclination 80, of the mean ray AB is assumed to be known, as are also the values of the following:—angles AOB, AOC, AOY, ABC, OBC and BOY are equal to 90 degs. The side angle of divergence of the ray AC is the angle 81, between the projection of AC and AB on the plane XOY, and the value of this angle 81 is also assumed; the only unknown, then, which it is desired to find in terms of the known, is the angle 82 which is the inclination of the ray AC to the horizontal, and the value of 82 can be found as follows:

(1) $\tan 80 = \dfrac{AO}{OB}$ (2) $OC = OB \sec 81$, (3) $\tan 82 = \dfrac{AO}{OC}$, and substituting (2), $= \dfrac{AO}{OB \sec 81} =$ (4) $\dfrac{AO}{OB} \cos 81$.

From (1), $\dfrac{AO}{OB} = \tan 80$; substituting (1) in (4), (5) $\tan 82 = \tan 80 \times \cos 81;$ but tan 80 is a constant for any particular case, and therefore it can be stated that:— the tangent of the angle of inclination of any sidewise-diffused ray, (AC) reflected from the mean transverse differential strip of any element to intersect the mean viewing line (BC), is directly proportional to the cosine of the angle (81), formed on a horizontal plane between the projection (OB) of the ray (AB) intersecting the mean viewing line (BC) perpendicularly and the projection (OC) of the said sidewise-diffused ray (AC). By the application of the above rule it is possible to determine accurately the shape of the surface of the element 1, Figs. 2, 3 and 4, so that rays reflected therefrom will illuminate an area having parallel sides. This feature will be further described in connection with Figs. 17, 18, and 19 which show a graphical construction. In Fig. 10 I have assumed the mean viewing line to be straight and horizontal and parallel to the general screen surface, and have taken the point C in said line; it will be be understood, however, that if only the position of the said point C in space, and the values of the angles 82 and 81 are known, the value of the angle 80 may be readily determined; consequently, the relation of the spot on the element which would reflect a ray to B, to any other spot on the element which would reflect its ray through some other point on the line OX may be found. Thus, if a number of points in a line of any configuration in space are known, through which light is to be reflected by a given element, the angle which each spot reflecting light through said line forms with a given spot at some predetermined place on the element may be calculated. On a curved reflecting surface the angle between the two spots will be one-half the angle between the rays reflected from the said spots.

In Fig. 11, a projector 13 is set up in a building through the window, or opening 21, of which it projects images of any desired character to fall upon the screen 12, located at a suitable elevation and inclination on the opposite side of the street. Some of the projected rays comprising the beam delineating the image are shown by the arrowed lines $F^4$. An element $P^1$, on the screen surface, is of such curvature, bounded by a periphery inclosing a proper area and shape of surface, and so placed at the correct angle with relation to the pencil of rays incident upon it, as to reflect and diffuse these rays in a pencil $R^1$, so that they intersect and embrace an area approximating the shape of the horizontal plane 16, of predetermined outline and assumed to be at the average level of the eyes of spectators on the sidewalk. Similarly, the element $P^2$ is properly curved, shaped and positioned so as to reflect its rays $R^2$ to intersect the plane 16 so that approximately all rays reflected from it are directed within the predetermined outline of said plane. It is, therefore, evident that the bounding surfaces of the solid angles of the pencils $R^1$ and $R^2$ intersect each other at the mean viewing plane, and a spectator within the said plane 16 can see light rays reflected from both of the elements $P^1$ and $P^2$. All elements on the screen whose use is essential to securing a continuous projected image throughout the plane 16 project their rays in the same manner as the elements $P^1$ and $P^2$, so that the spectator sees the entire image on the screen regardless of his position in the viewing plane. In order to obtain this intersection of the rays from all the elements—the said elements being considered of uniform degree of curvature over the entire screen surface—it is essential that the projector be positioned at a proper distance from the screen, and also that every element on the screen be at exactly the correct angle of obliquity to the rays incident upon it and, therefore, that all portions of the surface of the element be of the requisite curvature and obliquity to the incident rays, as will be fully described in connection with Figs. 17, 18, 19, 36, 37, etc. Generally the screen may be made spherical or parabolic and all the elements form the same angle with the general surface of the screen at the point where the element is located; but it should also be noted that a flat screen may be employed, made up of elements which become gradually more and more oblique to the screen surface in proportion to the magnitude of the angle of incidence of the rays projected upon them. Strictly speaking, the peripheries of intersection of no two pencils of reflected light with the viewing plane 16 will exactly coincide, as will be readily understood by considering the fact that the various elements on the screen are not at uniform distance from any given point in the plane 16; furthermore, the reflected pencils will generally be of variable divergence owing to the fact that the projector can seldom be located at the exact center of curvature of the general screen surface. In order to partially overcome the slight errors due to the aforesaid failure of the beams to intersect each other exactly as desired, I prefer to make the screen so that its curvature can be adjusted slightly—that is, so that its corners and sides are warped from a true spherical surface, or so that its transverse and longitudinal curvatures are of different radii. The correct angle of incidence of the general screen surface at any point, with the rays projected upon such point may be determined either graphically or analytically provided the angles of transverse and longitudinal diffusion and also the inclination of the pencil of rays diffused from the specular element at that point are known. When a spherical or parabolic screen is used considerable adjustment may be made by varying the relative positions of the projector and screen, to cause a greater or less divergence and inclination of the rays diffused thereby, in order to attain the most successful distribution for any specific case. The mean viewing plane 16 is of substantially uniform width, preferably, throughout its entire length, the same as the plane 16, Figs. 8 and 9; it should be understood, however, that the surface 16 need not invariably be a plane but may be curved to suit conditions; neither need it be always horizontal, but may be also vertical or oblique. Furthermore, the periphery of the viewing surface can be either straight or curved, and the elements can be designed, by following the rules disclosed in this specification, so as to reflect substantially all rays to fall within the said periphery. It should be understood that I do not wish in all cases to confine the rays within a sharply defined polygon, such as a rectangle, rhomboid or triangle, but will consider as being within the scope of the invention surfaces lying between two or more straight or curved lines which may be either parallel or oblique to each other. A considerable degree of accuracy is required not only in shaping the reflecting elements on the screen surface but also in assembling the screen itself; but by close attention to the matter herein disclosed a person versed in the art can design and build a screen performing the several functions above enumerated.

In Figs. 12 and 13 the specular surface of each element 3 is concave both longitudinally and transversely. It will be noted that the portion 26 which joins the elements curves upwardly at the center This will be understood by considering that a ray from a point in the middle of the element will be reflected at a less inclination to the horizontal than a ray from a point at the side of the said element lying in the same horizontal plane as the middle point. This will be clearly understood from the description of Figs. 17, 18 and 19.

In Figs. 14, 15 and 16 the unit specular element 1, having a continuously curved surface, is shown divided into a series of longitudinal, differential strips $h^1$, $h^2$, etc., and at the middle of each strip is a differential area $k^1$, $k^2$, etc., which may be considered as the mean, elementary area of each longitudinal, differential strip, and which is preferably half-way between the top and bottom of each of the said strips. These longitudinal strips may be of equal or unequal length and degree of curvature, as desired, although generally the former is preferable. The projection of the vertical angle between the central mean elementary area $k^3$ and the mean elementary area $k^4$ is the angle $k$, and the projection of the horizontal angle is $h$. Assuming various values of the angle $h$ to satisfy any desired conditions the corresponding values of $k$ may be readily determined by applying the rules laid down in the description of Fig. 10. It will be noted that the longitudinal strips $h^1$, $h^2$, etc., although of substantially equal length and degree of curvature are in different zones, and consequently each strip reflects the projected light rays incident upon it at a different inclination; the strip $h^3$ (considered as a unit), for example, will reflect the rays incident upon it at a greater inclination to the horizontal than will the strip $h^4$. All of these adjacent strips reflect the rays to adjacent areas in the viewing surface, resulting in a continuous, illuminated area thereupon, so that a person anywhere within the viewing surface can see reflected light from some point on the said element.

In Figs. 17, 18 and 19 certain rays, $a^4$, $b^4$, $c^4$, $d^4$, etc., comprising a portion of the pencil $D^2$, the same as shown in Figs. 8 and 9, are projected to fall upon the specular surface of the element 1, and are reflected at the actual inclinations to the horizontal indicated by the arrowed lines $a$, $b$, $c$, $d$, etc. The angles of inclination and sidewise-divergence of these said lines $a$, $b$, $c$, $d$, etc., are identical with the corresponding angles for correspondingly designated lines in Figs. 8 and 9; and it is here desired to explain the simple graphical method by which the curvature of the transvers differential strip 63 is determined, in order that the rays reflected therefrom shall intersect the line 17—17 in the viewing plane 16, Figs. 8 and 9. The dimensions of an element on the screen are negligible (it may be considered as a point) in comparison to the distance of the projector from the said element; and the angle of the cone of rays leaving the objective and focusing upon a spot the size of the element and at a great distance from the objective is so small (if the aperture of the objective be 2 inches diameter and a lantern be 100 feet from the screen the angle of the cone of rays is approximately $0°—3'$), that the incident rays, for all practical purposes, can be considered parallel. Their deviation from a true parallel causes a slight increase in the angle of dispersion from the element, the said increase being twice the angle of the cone of rays. Consider all rays in the incident pencil as parallel; then, if this pencil strikes a curved mirror of, say, one degree of curvature vertically, the pencil of reflected rays will be diverged through an angle of two degrees vertically. Referring back to Figs. 8 and 9 of the drawings: it is evident that the difference between the angles of inclination to the horizontal of any two reflected rays is twice the vertical, or longitudinal, angle between the differential zones on the elements from which said rays are reflected. For example, if the angle between the lines $a^1$ and $b^1$, Fig. 9, is, say, two degrees, then the longitudinal angle between the differential zones from which these rays are reflected on the specular surface is one degree. Referring again to Figs. 17, 18 and 19: in Fig. 18 the reflected ray $a$ is seen to lie in the vertical plane passing through the axis of the incident pencil (represented by a single line) $D^2$, while the rays $b$, $c$, $d$, etc., are diffused sidewise at various angles, the magnitude of which is, of course, twice that of the angle between corresponding points of reflection of the said rays as measured in degrees curvature of the specular surface. Having determined the actual angles of inclination of the reflected rays $a$, $b$, $c$, $d$, etc., by means of the method shown in Figs. 8 and 9, and determining also either graphically or analytically the longitudinal and transverse degrees of curvature of the reflecting surface 1 to enable rays reflected from it to embrace the width and length of the viewing surface, points $a^3$, $b^3$, $c^3$, etc., are laid out (see Fig. 17) so that the transverse angle (or what may be considered as the angle between differential lunes or longitudinal strips) in degrees curvature of the specular surface between points of reflection of any two rays is one-half the transverse angle of divergence of the said reflected rays. Similarly, the longitudinal angles between the transverse differential strips or zones may be determined, and through the points of intersection of corresponding longitudinal and transverse strips (shown as lines in Fig. 17) a curve 63 is drawn. Parallel rays, $a^4, b^4, c^4$, etc., received upon a differential area of the shape of 63 and lying upon the uniformly curved specular surface 1, will be reflected at the desired different inclinations and will intersect a practically straight, narrow and continuous area or line, such as 17—17, in a horizontal plane such as 16, Figs. 8 and 9. The line 17—17 lies within and ordinarily will substantially bisect the plane 16; consequently the transverse strip 63, Fig. 17, will substantially bisect the area of the element 1. By further consideration of the characteristics of this element 1 it is seen that: (a) The rays which are reflected from the central longitudinal strip, or lune, will be at the greatest inclination to the horizontal; whereas, the most widely-diverging side rays, namely, those reflected from the edges of the element, will be at less inclination to the horizontal. (b) Adjacent, differential, longitudinal strips of rays will be reflected through substantially equal longitudinal angles, but at different inclinations. (c) The top and bottom peripheries are of the same general curvature as the mean, transverse strip 63, and corresponding points in the said peripheries are equidistant from corresponding points in the continuously-curved strip 63. (d) Adjacent areas of the strip 63 control the direction of the rays reflected from them so that they intersect adjacent areas at predetermined locations in the mean viewing surface. (e) The areas so intersected are in predetermined alinement with each other. (f) The element reflects rays through a wide angle horizontally and a narrow angle vertically. (g) The rays are so reflected from the mean transverse strip that they lie in oblique, parallel planes $a^2$, $b^2$, $c^2$, etc., as shown in Fig. 19. (h) The elements are oblique and reflect the rays received upon them, from the projecting apparatus, obliquely to intersect a given area of substantially predetermined design and outline. In determining graphically the design of these elements for any specific case, the actual lengths of the rays and the angles they form with each other in order to intersect certain points in the viewing surface, should be found by development, that is, by the principles of descriptive geometry. Although Figs. 17, 18 and 19 show an element whose reflecting surface is convex both vertically and horizontally, it will be understood that the shape of the mean transverse strip can be similarly determined for reflecting surfaces which are concave in both directions, or concave in one direction and convex in the other.

In Figs. 20 and 21 the specular elements 4 are shown molded on a metal structure 30, representing a portion of a screen plate. The elements 4 are concave transversely and convex longitudinally, and adjacent transverse rows are connected by the oblique, plane, joining portion 31. The mean transverse differential strip 32, of each element bisects the surface of, and is equidistant from the top and bottom peripheries of said element.

In Figs. 22 and 23 the curved elements 5 on the structure 38 are rectangular in shape and contact each other on all sides so that the joining portion in this modification is only a curved line. The transverse differential strip 33 bisects the element and is equidistant from the top and bottom peripheries of said element.

In Fig. 24 the element 6 is shown bounded by an irregular or broken periphery. A screen provided with elements of this shape may be advantageously used where it is desired to distribute the rays over a viewing plane the right-hand half of which is nearer the screen than is the left-hand half, since the axis of the beam of light dispersed from the said right-hand half is at a greater inclination to the horizontal than that dispersed from the other half of the element.

In Fig. 25, 15 is a screen provided with a plurality of specularly reflecting plates 66 having upon their surface a great plurality of elements 1, arranged in transverse and longitudinal rows. The line 55 indicates the slant of the viewing plane, such as an inclined surface, upon which the light rays are to be reflected and diffused. The transverse rows of elements should be arranged parallel to the line 55 in order to obtain the desired distribution upon the viewing surface. The pronounced slant of the viewing plane 55 is such as would be encountered upon an inclined street; and the plates are slanted as shown, so that the zone of light shall substantially parallel the space occupied by pedestrians traveling along the said street.

In Figs. 26, 27 and 28, the elements 7 are shown molded upon a glass plate 40. These elements are concave in vertical cross-section and either concave or convex in horizontal cross-section, and the joining portion between adjacent rows of oblique elements is scalloped, as shown in Fig. 26. The back 37 of the plate 40 is silvered and is preferably flat. Light rays received by elements of this type will be refracted and reflected as shown by the arrowed lines, and the reflected pencil of light will have substantially the same characteristics, as regards distribution, as the pencil reflected from the elements 1, Figs. 1, 17, 18, etc. For example, the rays received upon the central section of the element, at M—M, are diffused at a greater inclination than are those received upon the sides, as at N—N.

In Figs. 29 and 30 the projecting apparatus 13 is positioned at such a distance from the curved spherical screen 12, whose center of curvature is at the point 60, that the mean ray (that is, the ray from the approximate center) $B^1$, $B^2$, $B^3$, $D^1$ and $E^1$, from each element is reflected to intersect a given point 56 in the mean viewing line 17. It will be noted, Fig. 29, that the rays from the elements are diffused sidewise through angles equal approximately ("approximately" on account of the plan view not being a true development) $D^5$, $D^6$ and $D^7$, and vertically through an angle equal approximately $D^8$. It will be understood that the elements 3 as shown here are greatly out of proportion to the actual size of the screen, and are shown thus magnified merely for diagrammatic purposes. If the projector 13 be located at such a distance from the screen 12 as to cause the mean rays to intersect at the point 56, then the limiting rays $C^1$, $C^2$, $C^3$ and $C^4$, $C^5$, $C^6$, from other corresponding points on the elements will intersect each other at points 57 and 59 which do not lie within the surface of the plane 16. In order that the limiting rays of the various pencils of light reflected from the several elements shall intersect each other at or near the desired points on the periphery of the viewing plane, I move the projector 13 nearer the screen 12, as by such an arrangement it is possible to so control the reflected rays as to confine them almost entirely within the desired periphery of the said plane 16. It should be noted, in this connection, that spectators whose eyes are at the level of the plane 16, and anywhere within its periphery, are enabled to see the entire projected picture on the screen, as rays from every element thereon intersect each other at all points substantially within said plane. Although preferably positioned on the axis of the screen, the projector may be moved off the axis and project its beam of rays $F^1$ obliquely upon the said screen; the projector should, however, be always at such a distance from the screen as to cause a convergence of reflected rays from corresponding points of the elements, as previously noted in connection with Fig. 11. The intensity of the light diffused from the elements located on different portions of the screen will vary somewhat owing to the fact that all the elements do not receive their rays at the same angle except when the screen is perfectly spherical and the projector is placed at its exact center. As previously noted, I prefer that the curvature and position of the screen and also the position of the projector be susceptible of slight adjustment, which may be made after the screen is set in position, in order to secure the maximum efficiency from the entire plant. The intensity of the rays reflected from different portions of any element need not be uniform in order for the spectator to see a picture of uniform brilliancy, for the obvious reason that his eyes receive corresponding rays from all the elements; under these conditions, however, different spectators at a uniform distance from the screen will not ordinarily see equally brilliant images. The elements on the screen may, however, be so designed and proportioned that the pencils of rays which strike the viewing plane at equal distances from the screen shall be of practically equal intensity; moreover, the elements may be so proportioned that the reflected pencils of rays which strike the viewing plane at a great distance shall be of greater intensity than those striking it near the screen. The viewing plane will ordinarily be rhomboidal in shape, but may, of course, assume any shape desired. The proper shaping of the peripheries of the elements is very important, as only by limiting the area and outline of the curved specular surface can the confinement of the diffused rays within a surface of predetermined outline be accomplished. Where the screen is located below the viewing plane, it is evident that the said screen may be turned upside down and the projector positioned either above or below the said viewing plane.

In Figs. 31, 32 and 33 the oblique elements 2 on the structure 28 are of convex curvature longitudinally and of concave curvature transversely; adjacent transverse rows are united by the oblique joining portion 25. The elements are bounded on their longitudinal sides by circular arcs 67, substantially parallel to each other, and on the top and bottom by eccentric arcs of substantially equal radii. Although specifying circular arcs, it will be understood that other curves may be used where expedient. The reason the joining edges are curved instead of straight will be understood by analyzing the configuration of the line of intersection of two similar intersecting concave or convex surfaces, such, for example, as two 6-inch parabolic or ellipsoidal mirrors. Consider that a plane parallel to the axis of such a mirror and 2 inches away from its axis intersects the mirror in a given line and that the said mirror be cut off to coincide with this plane. Cut the other mirror in precisely the same manner; then let these two mirrors be placed together on the cut surfaces, when it will be observed that the line of contact is curved. This line of contact, when occurring along a vertical plane between two adjacent similar elements on the screen herein described is referred to as a "curved joining edge." Substantially parallel rays $b^5$ and $b^6$ received upon a surface of the configuration of the element 2, near its lower periphery 69, at the points $P^5$ and $P^6$, will be reflected downwardly and sidewise as shown by the arrowed lines $c^5$ and $c^6$, and will entirely clear the joining portion 25. This is made plain by a study of Figs. 31 and 33, particularly in regard to the path of the reflected rays $c^5$. If the joining portion 25 is polished and made oblique, as shown, some of the rays incident upon it will be reflected in undesirable directions, as will also a small portion of the rays striking near the point $P^6$; and in order to overcome any such undesirable reflection the portion 25 may be blackened or roughened, as it is well known that such treatment will render dull those portions of a reflecting surface which without said treatment would appear bright. The element 2 should be designed in accordance with the principles stated in connection with Figs. 10, 17, 18, 19, etc.; and a screen provided with a great plurality of these elements will be extremely efficient, as substantially every ray received upon the surface of the screen is projected by a single reflection to fall within the area of the viewing plane. The joining portion 25 may be made normal to the general screen surface or it may slant downwardly from the front, as shown in Fig. 44. The function of the joining portion is primarily to serve in holding adjacent horizontal rows of the reflecting elements in their proper positions, and to render possible the manufacture of a plate or sheet which shall contain a large number of the small elements all rigidly fixed with relation to each other and to the general plane of the plate itself. For ease of manufacture the quite oblique joining portion will be found preferable to that which is substantially normal to the general plate surface (on account of rupturing the material in the process of stamping or rolling); but on account of double reflection of the light rays (described in connection with Fig. 34) it is generally desirable that the obliquity of the joining portion do not depart more than a few degrees from a normal to the screen surface, in order that the least loss of light and double reflection shall be caused by its presence.

In Fig. 34 a portion $a^5$ of a pencil of rays is shown incident upon the lower part of the curved element 8 and also upon the curved joining portion 43. Certain of the rays $a^5$ are once reflected, as shown by the arrowed lines $a^7$; but the rays $a^6$, incident upon the joining portion 43 and upon the very bottom of the curved element, are twice reflected and emerge from the screen surface at a less inclination than the rays $a^7$. It should be understood that the lines $a^6$ represent merely the axes of the small pencils of the incident and reflected rays; and it will be appreciated that the reflected pencil of rays $a^6$ will be diverging to such an extent that spectators in its path will also be in the path of rays reflected from similar parts of other elements and their joining portions. The rays $a^7$ are reflected through an angle embracing the mean viewing area or plane, while the rays $a^6$ are reflected to embrace a secondary viewing area; and their function is to enable the operator of the projecting apparatus (ordinarily located at a considerable elevation above the viewing surface) to note the appearance of the pictures projected upon the screen. The rays projected into the secondary viewing angle go in a positive, and not merely an incidental direction, and through an angle of desired and predetermined divergence; furthermore, although the intensity of the said secondary beam of light should be substantially the same as that of the beam directed into the principal viewing angle, such a restriction is obviously unnecessary. Unless the joining portion 43 is very oblique, say, at an angle of about forty-five degrees with respect to the general screen surface, the rays influenced by it will ordinarily be reflected outside the principal viewing area and, consequently, no unevenness of illumination in said area will occur. The principles of double reflection may be readily applied to the rays dispersed into the principal viewing area; but, on account of the additional losses caused by double reflection, a decided advantage is gained by the use of elements so curved and proportioned as to accomplish the desired distribution by a single reflection only.

In Fig. 35 a projector 13 sends its rays $F^2$ to fall upon the concave screen 14. From two elements, represented by points, $P^3$, $P^4$, pencils of rays $R^3$, $R^4$, are reflected to embrace a long narrow viewing plane 18. This plane, although preferably of substantially uniform width throughout, may be of rhomboidal, triangular or other shape. The control of light rays to embrace the surface 18 should be such that rays from corresponding portions of the elements intersect each other at or near the said surface, the same as described in connection with Fig. 11. In Fig. 11 the viewing plane runs, however, in a direction substantially parallel, while in Fig. 35 it runs perpendicular, to the general screen surface.

In Figs. 36, 37, 38, 39, 40 and 41 the element 9 is convex in longitudinal cross-section, as shown in Fig. 37, and concave in transverse cross-section, as shown in Figs. 38, 39, 40 and 41. Small portions, 68, 69, 70, 71, of the entire pencil of rays received upon the element are of equal cross-section (that is, the number of rays in, and the intensity of, these said portions 68, 69, 70 and 71 are the same for all). By reference to Fig. 37 it will be noted that the longitudinal curvature of the element varies, being of sharp curvature at the top where the surface is most nearly parallel to the general screen surface, and gradually flattening out at the bottom where the surface is most oblique. Referring to Figs. 38, 39, 40 and 41, it is seen that in transverse cross-section the element is quite shallow at the top and gradually becomes deeper toward the bottom. An element constructed along these lines can be made to produce a most uniform distribution of the rays: for example, the pencil of rays 68 will be reflected through a comparatively large longitudinal angle 72, and a narrow transverse angle 76; the pencil 69 will be reflected through a narrower longitudinal angle 73 and a wider transverse angle 77 than the pencil 68; and so forth; the product of the degrees of longitudinal curvature by the degrees of transverse curvature of all the transverse strips on the element's surface being equal. That is to say, each of the pencils 68, 69, 70, 71, will be diffused through substantially equal solid angles, although the width and depth of the angles vary. The intensity of a pencil of parallel rays of light reflected from a differential or minute area of a specular surface curved in two or more directions—such as a surface of revolution— is inversely proportional to the product of the degrees of curvature longitudinally by the degrees of curvature transversely, provided the incident pencil of rays strikes the said minute area normally; for example, if the curvature of the minute area is, say, two degrees each way, the intensity will be equal to
$$\frac{1}{2\times 2}=\frac{1}{4};$$

and if three degrees by four degrees, the intensity will be equal to
$$\frac{1}{3\times 4}=\frac{1}{12}.$$

When, however, the incident pencil strikes the said minute or differential area obliquely the intensity of the reflected pencil varies also as the cosine of the angle of incidence of the said pencil with the differential area. In order that the entire beam of light may be reflected from all portions of the surface of a curved specular element with strictly uniform intensity, it is necessary that each differential area of said element be of such curvature, and at such an angle to the rays incident thereon, that the degrees of curvature longitudinally, multiplied by the degrees of curvature transversely, multiplied by the secant (the reciprocal of the cosine) of the angle of incidence of the rays on the said differential portion of the element, be a constant. This principle of constructing elements so as to obtain uniform distribution of the reflected light rays may be applied in determining the shape of the various specular elements herein described. In practice the rule need not necessarily be applied to infinitesimal or differential areas, but to entire strips extending across the surface of the element, so that the product of the average degrees of transverse curvature, of a given strip, by the average degrees longitudinal curvature, by the secant of the angle of incidence, is substantially the same for all narrow strips on the surface of the element. In surfaces of this character it is evident that the portion of the surface which is most nearly normal to the incident rays has the sharpest curvature, whereas, the portions which receive the projected rays most obliquely are of lesser curvature. Elements of the type above described may be advantageously used on the screen 14, Fig. 35, to diffuse the rays over a long narrow area; and the curvature of the various parts of the element 9 may be modified to give any desired intensity of the reflected rays upon different portions of the viewing surface.

In Figs. 42 and 43 the elements 10 are substantially diamond-shaped and have a curved joining portion 23 at the bottom. This element is convex longitudinally, as shown in Fig. 43, and may be either concave or convex transversely; when of ellipsoidal shape and curvature it will reflect rays so as to accomplish nearly the same distribution as the element shown in Figs. 36, 37, etc.

In Fig. 44 the joining portion 45 slants downwardly from the front so that all incident rays 46 strike the surface of the elements 44 and are, consequently, reflected exactly as desired. A small percentage of the reflected rays will strike the said portion 45; but they will be reflected away from the desired viewing space.

In Fig. 45 the portion 47, connecting transverse rows of elements 48, is provided with an aperture 49, which permits the escape of undesirable accumulations, such as rain or dust, from the element's surface. A screen provided with the openings 49 also offers less resistance to the wind than one made of a solid, unperforated sheet of glass or metal. As these apertures are in the joining structure, which is substantially normal to the general screen surface, their presence does not result in any loss of light. Screen plates constructed with apertures of any desired character may be made by the processes used in forming expanded metal sheets.

In Fig. 46 the screen structure 50 consists of a plurality of spherical or ellipsoidal elements 51, between certain portions of which

I provide perforations 52. A screen made of plates of this description will offer less resistance to wind pressures than will one having no perforations.

Although the various views of the elements show their peripheries, where the metal is bent, as sharp lines, it will be understood that, in practice, these edges will ordinarily be more or less rounded, causing general diffusion of a small percentage of the rays both within and without the limits of the desired viewing area. The loss resulting from the presence of these said curved edges will, however, be inconsiderable and does not affect the principle of the specular dispersion over a limited and definite viewing area of all rays reflected from what is to be considered the "working" or efficient part of the screen surface.

Instead of using a polished metal structure, the elements may be made of glass, of uniform or variable thickness, and having a reflecting back surface.

Large screens must necessarily be built up of a plurality of plates, and in assembling these plates it is essential that the distance between the nearest rows of elements, or corresponding parts of adjacent elements on any two adjacent plates be the same as that between adjacent rows on the body of the same plate; as otherwise streaks will appear which will be either dull or brilliant according to whether nearest corresponding parts of elements in adjacent rows are too close together or too far apart. The plates may overlap each other, the same as wallpaper, or may have abutting edges. The plates may be supported upon a suitable backing of wood or metal by screws or nails provided with polished heads of the configuration of the reflecting elements. A framework or shadow-box of necessary depth may be used, where desired, to shield the screen from undesirable sidelights. Reflecting plates provided with the improved form of elements of the proportions and obliquity described herein, may be cut in the shape of sign letters or characters and illuminated from any desired source or from a projector equipped with a slide bearing the design of said characters.

It is possible to apply certain features shown in some modifications generally to other modifications of the elements, and two or more forms of elements arranged alternately or in alternate rows may be used on the same screen to reflect light to several viewing areas; or one style of element may be combined with portions of another form.

Where screens of considerable height are used the elements at the top may be of less depth of curvature transversely and greater depth longitudinally than elements at the bottom of the screen, and the transverse rows of elements, from top to bottom of the screen may be of curvature varying gradually between that suitable for the said top and bottom rows.

When desirable that the operator of the projecting apparatus be enabled to note the actual condition of the image on the screen, as viewed from the mean viewing surface, a flat or curved mirror may be positioned obliquely at some suitable place in the path of the rays directed to said surface, so as to reflect upwardly to the said operator a portion of the rays comprising said image.

The reflecting portion of the elements should be a generated or warped surface or a surface of revolution, or of such nature that it can be accurately duplicated by machinery, so that all the elements on the screen, or at least, on a certain area of the screen shall be identical.

In order to design an element which will reflect the rays incident upon it so as to cover a given length and breadth of viewing area certain facts must be known, namely: (a) The elevation above the viewing plane of the centre of the screen; (b) the approximate length and breadth of the viewing area; (c) the horizontal and vertical distances of the mean viewing line 17—17, Figs. 8, 9, 29 and 30 from the screen center (the same as the position of the middle element on the screen). The size of the element should be such that when seen from the viewing plane, its outline will be indistinct—so that the surface of the screen will appear smooth and continuous (if viewed from a distance of about 150 ft. the elements should not be larger than one-half inch square, in order to avoid giving a checkered appearance to the projected picture). Assume (a) the middle element of the screen, on the front of a building (see Fig. 11), to be at a height of 50 ft. above the viewing plane; (b) this element to be 125 ft. across the street from the mean viewing line (corresponding to 17—17, Fig. 8); (c) the length of the plane to be 280 ft.— the same as the mean viewing line 17—17 which parallels the general surface of the screen—and the width of this area to be 30 ft. The general arrangement of the plant to correspond with that shown in Figs. 8 and 9, which show the arrangement for a symmetrical system; or to Figs. 11, 29 or 30, which show practically the same thing. Referring to the description of Figs. 8 and 9; the mean viewing line 17—17 will be (substituting the values above assumed)

$$\sqrt{125^2 + 50^2} = 135 \text{ ft.}$$

from the middle element, and at an agle whose $$\tan \frac{50}{125} = 22 \text{ deg.}$$

below the horizontal line $D^2$. This shows that the middle ray from the middle of the middle element which intersects the middle of the viewing plane will have a slant of 22 deg. to the horizontal and will be directed so that it lies in a vertical plane which is perpendicular to the screen at its middle point. As the incident ray has been assumed to strike the screen at its middle point and normal to its surface and as it is reflected at an angle of 22 deg. to this normal, it is evident that the slant of the element at that particular point from which this single ray is reflected must be $$\frac{22}{2} \text{ deg.} = 11 \text{ deg.}$$

from the vertical. (If a small plane mirror were placed at the middle of the screen and were to reflect an incident pencil of rays to intersect the middle of the viewing plane, this plane mirror would have to be downwardly tipped 11 deg. from a true vertical position. If a horizontal ray strikes a plane vertical mirror perpendicularly the ray will be reflected back upon itself; if the mirror be tipped five deg. the ray will be reflected ten deg. from its path of incidence. Instead of basing the various calculations in this specification on tipping plane mirrors a given angle in any direction with respect to a given fixed direction of an incident ray, it will be seen that I have generally considered the points on the curved specular surface as being a certain number of degrees of surface curvature away from a fixed or predetermined point, as noted in the description of Figs. 17, 18 and 19. This reflected ray therefore strikes the viewing plane at an angle of 22 deg. The pencil of rays must be wide enough to embrace the width of the viewing plane, and since the element is 135 ft. away and the viewing plane is at an angle of 22 deg. to the ray incident upon its center, the vertical angle of dispersion caused by an infinitesimal vertical strip extending up the middle of the element from top to bottom, is 5 deg. (by the trigonometric formula for solving an oblique triangle, given two sides and the included angle). As this vertical dispersion is 5 deg., it is evident that the total vertical curvature of the element is $$\frac{5}{2} \text{ deg.} = 2.5 \text{ deg.},$$

or, substantially 1.25 deg. above and 1.25 deg. below the middle point of the element. Proceeding in a like manner, it is found that in order for the dispersed pencil of rays to cover the entire length (140 ft. each side of the center) of the 280 ft. viewing plane, the rays must be dispersed sidewise through an angle of 92 deg. The only remaining factor is the plotting of a sufficient number of points to determine the configuration of the mean transverse differential strip, and this is done, one point at a time, (three points each side of the middle point of the element ordinarily sufficing) by substituting known or trigonometrically derived values in the formula, $$\tan 82 = \tan 80 \cos 81,$$

as pointed out in the description of Fig. 10 of the drawings.

I know that a projection screen employing curved specular elements, arranged oblique to the axis of the screen, is not new, as this forms the basis of my application, Serial Number 585,532, but what I claim is:—

1. A projection screen provided with a surface composed of small curved specular elements arranged in transverse rows, the general surface of each of the said elements being oblique to the general surface of the screen, a joining structure connecting adjacent transverse rows of elements and disposed substantially normal to the general screen surface, the said joining structure being convex at the bottom of each element and concave at the top; substantially as described.

2. A projection screen provided with a great plurality of specular elements each comprising a portion of a surface of revolution, the most oblique portion of said surface being at the lowest point of the element; substantially as described.

3. A projection screen provided with a great plurality of specular elements of convex curvature longitudinally, and concave curvature transversely, adjacent transverse rows of said elements being connected by a scalloped joining structure; substantially as described.

4. A projection screen provided with a plurality of specular elements each comprising a portion of a surface of revolution and oblique to the general screen surface, the most oblique portion of the surface of each element being at its lowest point; substantially as described.

In witness whereof, I have hereunto set my hand this 25th day of June, 1913.

PAUL L. CLARK.

Witnesses:
   D. F. MORHOUS,
   CHAS. GAUL.